(12) United States Patent
Toulhoat et al.

(10) Patent No.: US 8,349,281 B2
(45) Date of Patent: Jan. 8, 2013

(54) PROCESS FOR SEQUESTRATING CARBON IN THE FORM OF A MINERAL IN WHICH THE CARBON HAS OXIDATION NUMBER +3

(75) Inventors: Hervé Toulhoat, Herblay (FR); François Ropital, Rueil Malmaison (FR); Sébastien Duval, Evron (FR)

(73) Assignee: IFP Energies nouvelles, Rueil-Malmaison Cedex (FR)

( * ) Notice: Subject to any disclaimer, the term of this patent is extended or adjusted under 35 U.S.C. 154(b) by 1220 days.

(21) Appl. No.: 10/584,047

(22) PCT Filed: Dec. 10, 2004

(86) PCT No.: PCT/FR2004/003209
§ 371 (c)(1), (2), (4) Date: Aug. 11, 2008

(87) PCT Pub. No.: WO2005/070521
PCT Pub. Date: Aug. 4, 2005

(65) Prior Publication Data
US 2008/0296146 A1 Dec. 4, 2008

(30) Foreign Application Priority Data
Dec. 23, 2003 (FR) ....................................... 03 15209

(51) Int. Cl.
C22B 3/00 (2006.01)
C01F 1/00 (2006.01)
B01D 53/14 (2006.01)
C25B 3/00 (2006.01)

(52) U.S. Cl. ............ 423/1; 423/155; 423/158; 423/220; 205/440

(58) Field of Classification Search ................ 205/440; 423/155, 158, 1, 220
See application file for complete search history.

(56) References Cited

U.S. PATENT DOCUMENTS

| | | | |
|---|---|---|---|
| 3,720,591 A | | 3/1973 | Skarlos |
| 4,160,816 A | | 7/1979 | Bloom et al. |
| 4,275,234 A | * | 6/1981 | Baniel et al. ................ 562/584 |
| 4,673,473 A | * | 6/1987 | Ang et al. .................... 205/441 |
| 6,364,938 B1 | * | 4/2002 | Birbara et al. ................ 95/139 |
| 6,524,843 B1 | * | 2/2003 | Blais et al. ..................... 435/266 |
| 2002/0029574 A1 | | 3/2002 | Yoshioka | |

FOREIGN PATENT DOCUMENTS

| CS | 111531 | * | 7/1964 |
|---|---|---|---|
| DE | 23 01 032 A | | 7/1974 |
| JP | 06154554 A | * | 6/1994 |

OTHER PUBLICATIONS

Abbott et al., "Electrochemical Reduction of CO2 in a Mixed Supercritical Fluid", J. Phys. Chem B (no month, 2000), vol. 104, pp. 775-779.*
Sabbioni et al., "Oxalate Patinas on Ancient Monuments: The Biological Hypothesis", Aerobiologia (no month, 1991), vol. 7, pp. 31-37.*
Scurto et al., "Carbon Dioxide Induced Separation of Ionic Liquids and Water", Chem. Commun. (no month, 2003), pp. 572-573.*
Gentzis, "Subsurface Sequestration of Carbon Dioxide—An Overview from an Alberta (Canada) Perspective", International Journal of Coal Geology (no month, 2000), vol. 43, pp. 287-305.*
Edwards et al., "FT-Raman Spectroscopy of Lichens on Dolomitic Rocks: An Assessment of Metal Oxalate Formation", Analyst (no month, 2003), vol. 128, pp. 1218-1221.*
Bond et al., "Development of Integrated System for Biomimetic CO2 Sequestration Using the Enzyme Carbonic Anhydrase", Energy & Fuels (no month, 2001), vol. 15, pp. 309-316.*

* cited by examiner

Primary Examiner — Edna Wong
(74) Attorney, Agent, or Firm — Millen, White, Zelano & Branigan, P.C.

(57) ABSTRACT

A process for sequestrating carbon emitted into the atmosphere in the form of $CO_2$ comprises:

a) a step for concentrating $CO_2$ in the liquid phase;
b) a step for electro-reduction in an aprotic medium to a compound in which the carbon changes to oxidation number +3 in the form of oxalic acid or formic acid;
c) if appropriate, a step for re-extracting oxalic or formic acid in the aqueous phase; and
d) a step for mineralization by reaction with a compound of an element M, resulting in a stable compound in which the atomic ratio C/M is about 2/1.

27 Claims, No Drawings

PROCESS FOR SEQUESTRATING CARBON IN THE FORM OF A MINERAL IN WHICH THE CARBON HAS OXIDATION NUMBER +3

The invention relates to a process for sequestrating carbon emitted into the atmosphere in the form of $CO_2$.

PRIOR ART

The electrochemical-reduction of $CO_2$ has been studied by a number of researchers, spanning the need to use it as a vast carbon supply source to attempts to use it as a source of energy in the form of methane.

Studies on the electro-reduction of $CO_2$ began in the middle of the 1960s. They show that changes in the medium, whether it is aprotic or not, and the electrode, which determines the interactions of the intermediate carbonyl radical with the surface, lead to the formation of various constituents, including: carbon monoxide, formic acid, methane and ethane, alcohols such as methanol, ethanol and propanol, and oxalic or glycolic acid.

Thus, $CO_2$ electro-reduction reactions on copper electrodes in a potassium carbonate medium produce yields of the order of 30% of methane.

Studies are known which have identified products which are preferentially obtained for media of a more or less aqueous nature and for different natures of electrodes.

First case: The $CO_2^-$ radical is adsorbed on the electrode

Aqueous medium (Au, Ag, Cu or Zn electrode): Carbon monoxide is formed

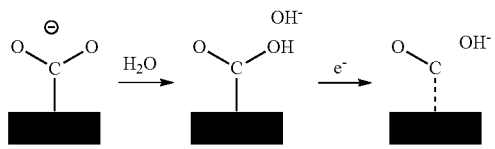

Non-aqueous medium (Au, Ag, Cu, Zn, Cd, Sn or In electrode): Carbonate is formed

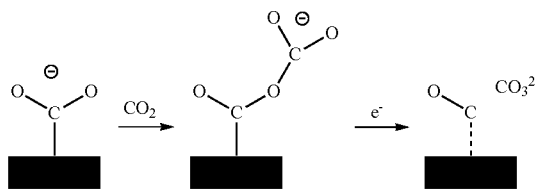

Second case: The $CO_2^-$ radical is not adsorbed on the electrode

Aqueous medium (Cd, Sn, In, Pb, Tl or Hz electrode): Formic acid is formed

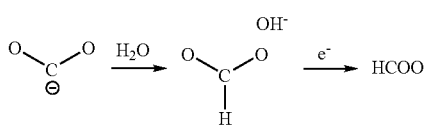

Non-aqueous medium (Pb, Tl or Hg electrode): Oxalic acid is formed

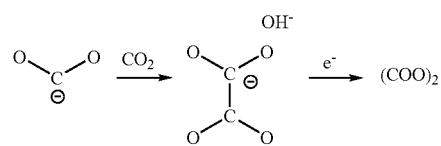

In this context, experiments have also been carried out on $CO_2$ in the gas phase on perovskites, which preferentially produce alcohols.

Studies concerning the capture of $CO_2$ by organic solvents have also been carried out—they finish by producing $CO_2$ in the liquid form. That $CO_2$ is then injected into the ocean bottom or, preferentially, into subterranean cavities. However, the durability of such storage facilities over very long periods is uncertain.

DESCRIPTION OF THE INVENTION

A novel process for sequestrating carbon emitted into the atmosphere in the form of $CO_2$ has now been discovered which can allow carbon to be sequestrated at moderate energy costs, and more particularly limits the emission of greenhouse gases into the atmosphere consequent upon the combustion of fossil hydrocarbons.

The sequestration process of the invention comprises:
a) a step for concentrating $CO_2$ in the liquid phase;
b) a step for electro-reduction in an aprotic medium to a compound in which the carbon changes to oxidation number +3 in the form of oxalic acid or formic acid;
c) if appropriate, a step for re-extracting oxalic or formic acid in the aqueous phase; and
d) a step for mineralization by reaction with a compound of an element M, resulting in a. stable compound in which the atomic ratio C/M is about 2/1.

The successive steps of the process of the invention are described in more detail below.

The liquid phase concentration step a) may be carried out using a plurality of methods.

A first method i) consists of liquefying $CO_2$ using conventional $CO_2$ capture processes. The liquid $CO_2$ is then obtained under pressure, for example in the supercritical state.

A further pathway ii) consists of absorbing the $CO_2$ in a polar aprotic liquid which is not miscible with water or miscible with water in various proportions. Acetonitrile may be cited as an example.

In accordance with a further pathway iii), we envisage absorption of $CO_2$ in an aprotic ionic liquid (or "molten salt") which is not miscible with water or miscible with water in various proportions. A particularly appropriate ionic liquid is 1-butyl-3-methylimidazolium hexafluorophosphate, represented by the formula $[BMIM]^+PF6^-$.

A still further pathway iv) consists of absorbing $CO_2$ in an aqueous phase containing an alcohol and/or an amine.

A further method v) consists of absorbing $CO_2$ in the hydrated form in a solvent, for example aqueous, activated by an enzymatic pathway. The enzyme which activates hydration is generally carbonic anhydrase. In this case, the solution obtained may then be recycled to an aqueous phase absorption process in the presence of an alcohol and/or amine as defined in iii) above.

The aqueous solution obtained in the absorption method as defined in iv) or v) above may also be recycled to a liquefaction process as defined in i) above.

Further, the aqueous solutions obtained in processes as defined in iii) or iv) above are in general transferred into an ionic liquid medium which is insoluble in water by a liquid-liquid extraction process.

Depending on the method employed to carry out the first step of liquid phase concentration of the process of the invention, the liquid phase obtained will consist of liquid $CO_2$ or a solution of $CO_2$ or carbonic acid in a polar aprotic liquid which is not miscible with water or miscible with water in varying proportions, or in a non-aqueous ionic liquid (molten salt) with a variable miscibility with water.

The second step of the process of the invention consists of electro-reduction of $CO_2$ or concentrated carbonic acid in the liquid phase (oxidation number +4) to a compound in which the carbon has an oxidation number of +3. It is carried out in the liquid phase obtained in the preceding step, in general at a pH in the range 3 to 10, preferably in the range 3 to 7 and with an anode maintained at a potential of +0.5 to −3.5 volts with respect to a standard hydrogen electrode. The anode may be constituted by platinum, for example diamond doped with boron or carbon doped with nitrogen.

By means of this electro-reduction, the oxalic ion (in the form of oxalic acid or the oxalate) or the formic ion (in the form of formic acid or the formate) is formed.

If appropriate, electro-reduction step b) is carried out in liquid $CO_2$ under pressure.

Electro-reduction step b) may also be carried out in subterranean $CO_2$ storage into which liquid $CO_2$ may have been injected, if appropriate.

The third step c) of the process of the invention consists of a re-extracting the oxalic acid (or oxalate) or formic acid (or formate) using an aqueous phase. It is carried out when the electro-reduction has been carried out in a non-aqueous phase. The formation of formic acid by electro-reduction is generally carried out in the aqueous phase. It is not necessary in this case to carry out this step c) for re-extraction by an aqueous phase.

The final step d) of the process of the invention (mineralization step) generally consists of attack with a carbonated mineral, for example calciferous or magnesia-containing, with an aqueous solution of oxalic acid (or oxalate) or formic acid (or formate) from the electro-reduction step (optionally after re-extraction). Said solution is reacted with a compound of an element M to produce a mineral in which the atomic ratio C/M is about 2/1.

The reaction of the oxalic or formic compound with the carbonated mineral produces one mole of $CO_2$ per $C_2O_4$,

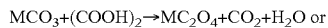

$MCO_3 + (COOH)_2 \rightarrow MC_2O_4 + CO_2 + H_2O$ or

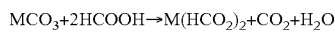

$MCO_3 + 2HCOOH \rightarrow M(HCO_2)_2 + CO_2 + H_2O$

The $CO_2$ liberated, half that used at the start, may be reintroduced into the inventive process cycle at the first step.

The element M may be any metallic element with an oxidation number of +2. It is usually calciferous or magnesia-containing. The compound of element M may then, for example, be a calciferous or magnesia-containing rock. The preferred element M is calcium. The mineral formed is preferably a calcium oxalate such as Whewellite, $CaC_2O_4 \cdot H_2O$.

The process of the invention (or only the last step) may be carried out ex situ or in situ in the calciferous or magnesia-containing rock.

Next, the final mineralization step d) may take place by bringing the solution of oxalic or formic acid into contact with a sedimentary rock for example calciferous or magnesia-containing, preferably by injection into the substratum.

It will be noted that as regards the energy balance of the process of the invention, the energy invested to change from carbon +4 to carbon +3 in the electro-reduction reaction of the second step is not lost: it is in fact stored in the mineral oxalate or formate which is formed. Clearly, the oxalic or formic acid could be re-extracted subsequently for use in combustion, for example in situ. It may concern oxidation, for example bacterial, in situ or ex situ. In these processes, the carbon would move to an oxidation number of +4.

EXAMPLES

Example 1

Liquid $CO_2$ was obtained by a conventional liquefaction process.

The reactor was filled with $CO_2$ liquid under pressure (50 bars at ambient temperature) and steadily supplemented with water to maintain the $CO_2/H_2O$ molar ratio to about 100 to orientate the reaction towards the synthesis of oxalic acid. Tetra-ammonium perchlorate was added in an amount of 0.1 mol/l.

The electrode was platinum and the current density was 5 mA/cm². The electrode potential was −3 V with respect to the potential of the $Fe/Fe^+$ couple. The solution was stirred to limit concentration effects at the electrodes.

The quantity of $CO_2$ to be electro-reduced fixed the quantity of electricity required.

After electro-reduction, the oxalic acid formed was injected into a receptacle containing calcium carbonate. The oxalic acid reacted with the carbonate to form a calcium oxalate. The increase in mass of the dried and cleaned residue demonstrated the sequestration of $CO_2$ in the mineral form.

Example 2

Liquid $CO_2$ was obtained by a conventional liquefaction process.

It was supplemented with tetra-ammonium perchlorate and injected into a subterranean cavity containing calciferous or magnesia-containing rocks. Electro-reduction was carried out directly in the cavity using a platinum electrode. The current density was 5 mA/cm². The electrode potential was −3 V with respect to the potential of the $Fe/Fe^+$ couple. The solution was stirred to limit concentration effects at the electrodes.

The synthesized oxalic acid reacted with the calciferous or magnesia-containing rocks liberating $CO_2$, which was also reduced, and a divalent cation which precipitated with the oxalate. The reactions finally resulted in the sequestration of $CO_2$ by a mineral pathway. The $CO_2$ liberated was recycled to the liquefaction step.

Example 3

$CO_2$ was absorbed with water in the presence of carbonic anhydrase as described in U.S. Pat. No. 6,524,843.

Tetra-ammonium perchlorate was added in an amount of 0.1 mol/l.

The electrode was platinum and the current density was 5 mA/cm². The electrode potential was −3 V with respect to the potential of the $Fe/Fe^+$ couple. The solution was stirred to limit concentration effects at the electrodes.

The quantity of $CO_2$ to be electro-reduced fixed the quantity of electricity required.

After electro-reduction, the formic acid formed was injected into a receptacle containing calcium carbonate. The formic acid reacted with the carbonate to form a calcium formate. The increase in mass of the dried and cleaned residue demonstrated the sequestration of $CO_2$ in the mineral form.

Example 4

$CO_2$ was absorbed into an ionic liquid, 1-butyl-3-methylimidazolium hexafluorophosphate, represented by the formula [BMIM]$^+$PF6$^-$.

Tetra-ammonium perchlorate was added in an amount of 0.1 mol/l.

The electrode was platinum and the current density was 5 mA/cm$^2$. The electrode potential was $-3$ V with respect to the potential of the Fe/Fe$^+$ couple. The solution was stirred to limit concentration effects at the electrodes.

The quantity of $CO_2$ to be electro-reduced fixed the quantity of electricity required.

The $CO_2$-saturated ionic liquid was brought into continuous contact with an aqueous solution which extracted the oxalate therefrom.

The aqueous oxalic acid solution which was formed was injected into a receptacle containing calcium carbonate. The oxalic acid reacted with the carbonate to form a calcium oxalate. The increase in mass of the dried and cleaned residue demonstrated the sequestration of $CO_2$ in the mineral form.

The invention claimed is:

1. A process for sequestrating carbon in the atmosphere, comprising:
   a) concentrating atmospheric $CO_2$ in a liquid phase, by any of the following: (i) liquefying $CO_2$ in a liquid phase under pressure up to the supercritical state; (ii) absorbing $CO_2$ in a polar aprotic liquid, not miscible with water, or miscible with water in various proportions; (iii) absorbing $CO_2$ in an aqueous phase containing an alcohol and/or an amine; or (iv) absorbing $CO_2$ in the hydrated form in a solvent, activated by an enzymatic pathway, with the provision that in (iii) and (iv) the resultant absorbed $CO_2$ is transferred to a water-insoluble ionic liquid medium;
   b) electro-reduction of resultant liquified $CO_2$ from (i), liquid or of resultant absorbed $CO_2$, in said polar aprotic liquid from (ii) or of resultant $CO_2$ from (iii) or from (iv) that has been transferred to the water-insoluble ionic liquid medium, to produce oxalic acid or formic acid in which the carbon changes to oxidation number $+3$;
   c) optionally extracting said oxalic acid or formic acid in an aqueous phase; and
   d) mineralization by reacting said oxalic acid or formic acid with a carbonate of an element M, producing a mineral in which the atomic ratio C/M is about 2/1, wherein M is any metallic element with an oxidation number of $+2$, and C is carbon, and wherein the oxalic acid and formic acid are in an acid or salt form.

2. The process according to claim 1, wherein in a) concentration in the liquid phase comprises the liquefying of said $CO_2$, the liquid $CO_2$ then being obtained under the said pressure, up to the supercritical state.

3. The process according to claim 2, in which the electro-reduction b) is carried out in liquid $CO_2$ under pressure.

4. The process according to claim 3, wherein mineralization (d) compriese attack of a carbonated mineral by an aqueous solution of said oxalic acid or formic acid.

5. The process according to claim 4, in which said carbonated mineral comprises a calciferous or magnesia-containing carbonated mineral.

6. The process according to claim 1, wherein in a) concentration in the liquid phase comprises (ii) the absorbing of the $CO_2$ in the polar aprotic liquid, not miscible with the water or miscible with the water in various proportions.

7. The process according to claim 1, wherein in a) the concentrating $CO_2$ in the liquid phase comprises (ii) said absorbing of $CO_2$ in an aprotic ionic liquid not miscible with the water or miscible with the water in various proportions.

8. The process according to claim 7, wherein said ionic liquid comprises 1-butyl-3-methylimidazolium hexafluorophosphate.

9. The process according to claim 1, wherein in a) concentration in the liquid phase comprises (iii) the absorbing of the $CO_2$ in the aqueous phase containing the alcohol and/or the amine.

10. The process according to claim 9, wherein a resultant aqueous solution obtained is transferred by a liquid-liquid extraction process to an ionic liquid medium which is insoluble in water.

11. The process according to claim 1, wherein in a) concentration in the liquid phase comprises (iv) the absorbing of the $CO_2$ in the hydrated form being activated by the enzymatic pathway.

12. The process according to claim 11, wherein a hydration activating enzyme comprises carbonic anhydrase.

13. The process according to claim 12, wherein a resultant liquid phase obtained in (iv) is then recycled to a process for absorption of $CO_2$ in an aqueous phase in the presence of an alcohol and/or amine.

14. The process according claim 13, wherein the aqueous phase obtained is recycled to a liquefaction process of $CO_2$ under pressure.

15. The process according to claim 1, in which the electro-reduction b) is carried out at a pH in the range of 3 to 10 and with an anode maintained at a potential of $+0.5$ to $-3.5$ volts with respect to a normal hydrogen electrode.

16. The process according to claim 15, in which the pH is in the range of 3 to 7.

17. The process according to claim 15, in which the anode used in the electro-reduction is platinum, diamond-doped with boron or carbon doped with nitrogen.

18. The process according to claim 1, in which the electro-reduction b) is carried out in liquid $CO_2$ under pressure.

19. The process according to claim 1, in which a compound from electro-reduction b) comprises said oxalic acid or an oxalate.

20. The process according to claim 19, in which the oxalic acid or oxalate is re-extracted by an aqueous phase.

21. The process according to claim 1 in which, at the end of a), liquid $CO_2$ is injected into a subterranean $CO_2$ store.

22. The process according to claim 21, in which electro-reduction b) is carried out in the subterranean $CO_2$ store.

23. The process according to claim 22, in which said mineral comprises a calciferous or magnesia-containing carbonated mineral.

24. The process according to claim 1, wherein mineralization (d) comprises attack of a carbonated mineral by an aqueous solution of said oxalic acid or formic acid.

25. The process according to claim 1, in which the element M is calcium and the mineral produced is Whewellite, $CaC_2O_4 \cdot H_2O$.

26. The process according to claim 1, in which the mineralization (d) reaction with the carbonate of metal M is effected by bringing an aqueous solution of oxalic acid or formic acid derived from the extraction (c) into contact with a calciferous or magnesia-containing sedimentary rock.

27. The process according to claim 1, in which a final mineralization comprises injection into a substratum.

* * * * *